(12) United States Patent
Dailey (10) Patent No.: US 11,232,168 B1
(45) Date of Patent: Jan. 25, 2022

(54) DIGITAL ADVERTISING OPTIMIZATION

(71) Applicant: INTROSPECTIVE ANALYTICS INC., Marietta, GA (US)

(72) Inventor: Robert James Dailey, Marietta, GA (US)

(73) Assignee: Introspective Analytics Inc., Marietta, GA (US)

( * ) Notice: Subject to any disclaimer, the term of this patent is extended or adjusted under 35 U.S.C. 154(b) by 58 days.

(21) Appl. No.: 16/682,017

(22) Filed: Nov. 13, 2019

Related U.S. Application Data (60) Provisional application No. 62/760,076, filed on Nov. 13, 2018.

(51) Int. Cl.
*G06F 16/957* (2019.01)
*G06F 16/955* (2019.01)
*G06F 16/958* (2019.01)
*G06Q 30/02* (2012.01)

(52) U.S. Cl.
CPC ........ *G06F 16/9577* (2019.01); *G06F 16/958* (2019.01); *G06F 16/9558* (2019.01); *G06F 16/9574* (2019.01); *G06Q 30/0277* (2013.01)

(58) Field of Classification Search
CPC .............. G06F 16/9577; G06F 16/958; G06F 16/9558; G06F 16/9574; G06Q 30/0277
USPC ......................................................... 715/234
See application file for complete search history.

(56) References Cited

U.S. PATENT DOCUMENTS

| 5,964,867 A | * | 10/1999 | Anderson | G06F 8/4442 |
| | | | | 712/207 |
| 2002/0152361 A1 | * | 10/2002 | Dean | G06F 12/123 |
| | | | | 711/160 |
| 2015/0039746 A1 | * | 2/2015 | Mukherjee | H04L 41/5067 |
| | | | | 709/224 |

FOREIGN PATENT DOCUMENTS

AU  2010203401 B2 * 4/2014 ......... H04B 7/18578

OTHER PUBLICATIONS

Frank, Jeremy. "Make Your Site Faster with Preconnect Hints: Viget." Https://www.viget.com, Viget, Jan. 17, 2018, www.viget.com/articles/make-your-site-faster-with-preconnect-hints/. (Year: 2018).*

* cited by examiner

*Primary Examiner* — Stephen S Hong
*Assistant Examiner* — Broderick C Anderson
(74) *Attorney, Agent, or Firm* — Taylor English Duma LLP (57) ABSTRACT

Systems, methods, and software for optimizing rendering performance of a web page containing one or more advertisements. Creative code related to an advertisement is received and a web page containing the creative code is virtually rendered while performance metrics regarding a plurality of connections to servers made during the rendering is collected. The collected performance metrics regarding the plurality of connections are analyzed to identify optimizations to be added to the creative code, and the creative code is modified by applying the identified optimizations.

17 Claims, 5 Drawing Sheets

DIGITAL ADVERTISING OPTIMIZATION

CROSS-REFERENCE TO RELATED APPLICATIONS

This application claims the benefit of U.S. Provisional Patent Application No. 62/760,076, filed Nov. 13, 2018, and entitled "DIGITAL ADVERTISING OPTIMIZATION," the entirety of which is hereby incorporated herein by this reference.

BACKGROUND

There are several specifications in the HTML protocol intended to allow web-browser applications to speed up loading and rendering of content in a page of a website. Among them are:

DNS prefetch—tells the browser to look up the IP address of a server before the page (or ad) needs it:

<link rel="dns-prefetch"href="http://example.com">

Preconnect—tells the browser to look up the IP address of example.com, initiate the TCP handshake, and if the connection is secure, to initiate the SSL connection all prior to the page (or ad) requesting it:

<link rel="preconnect"href="http://css-tricks.com">

Prefetch—tells the browser to preemptively fetch and cache the target asset as it is likely to be required for a follow-up navigation:

<link rel="prefetch"href="image.png">

Preload—similar to prefetching, except the browser must request the asset:

<link rel="preload"href="image.png">

Figure 1:
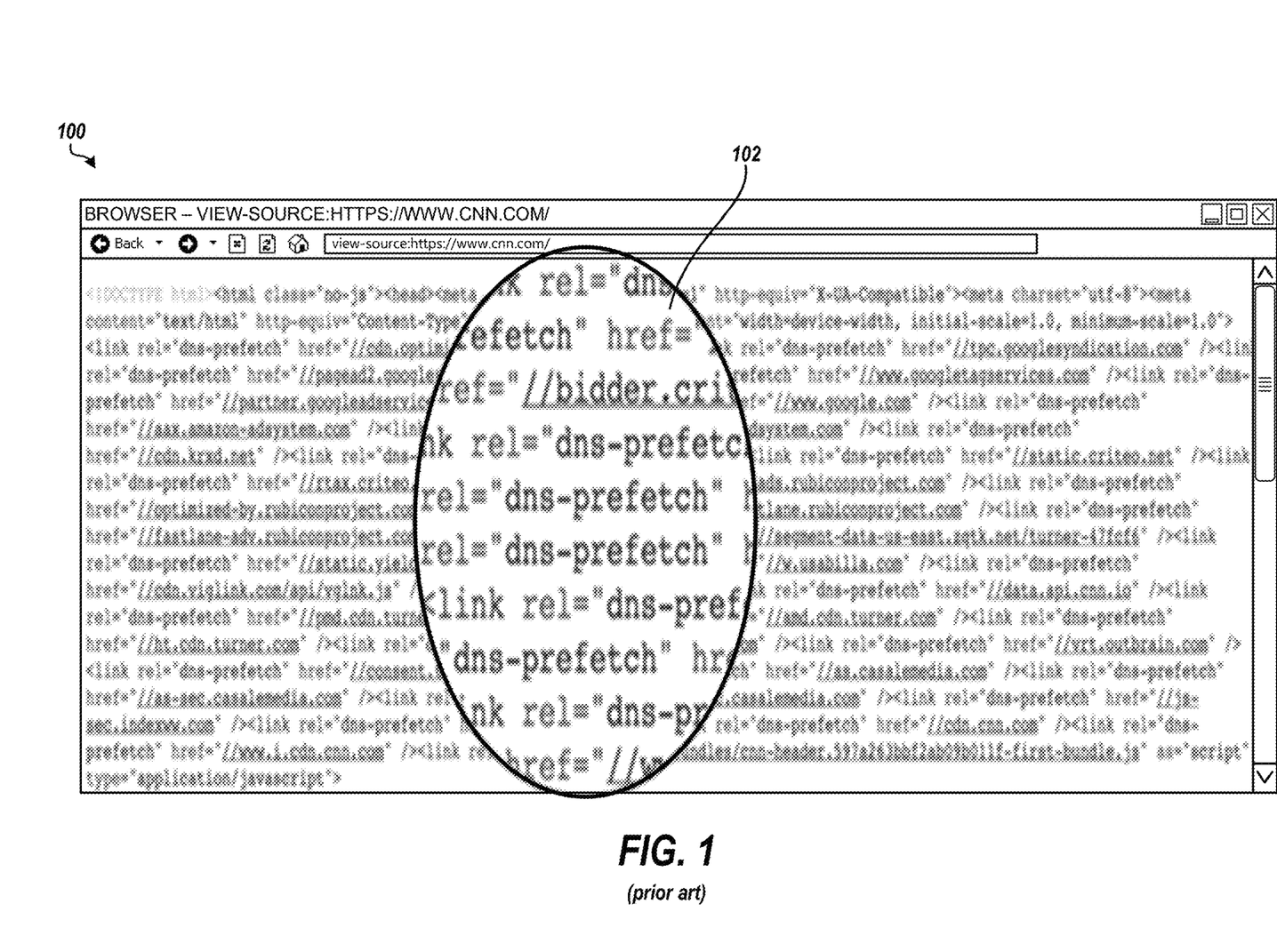
FIG. 1 is a screen diagram showing a browser window displaying source code from the HTML head section of a news web page showing exemplary connection optimization settings included utilizing traditional, manual methods, according to embodiments described herein.

These specifications may be used by website builders and are typically placed in the HTML header. An example of this may be seen in the browser window 100 shown in FIG. 1, showing exemplary specifications in a web-page header at 102. The reason the specifications are used at the website level is because these specifications only work if you know ahead of time what connections are needed. Generally, a website developer may know the resources any given page will need. In some instances, proper use of these specifications can result in an increase in page-load performance of 20% or more.

Conventionally, these specifications are only beneficial if the implementer knows the connections needed ahead of time, so they are generally not used in the context of digital advertising. Digital ads can change dynamically—at any given moment, an advertiser can traffic new creative content that may result in new connections that eliminate any performance gains from the use of these specifications. In some instances, use of these specifications may actually slow down the page load because the browser is proactively initiating calls and connections that it ultimately will not use.

It is with respect to these considerations and others that the disclosure made herein is presented.

SUMMARY

The present disclosure relates to systems, methods, and software for optimizing rendering performance of a web page containing one or more advertisements. An exemplary method of optimizing rendering performance of web pages containing one or more advertisements includes receiving at an optimization engine creative code related to an advertisement. A web page containing the creative code is virtually rendered by a web page testing service while performance metrics regarding a plurality of connections to servers made by the web page testing service during the rendering are collected. The performance metrics regarding the plurality of connections are analyzed by the optimization engine to identify optimizations to be added to the creative code, and the creative code is modified by the optimization engine by applying the identified optimizations.

In further embodiments, an exemplary system comprises a web page testing service and a processing resource. The processing resource executes an optimization engine configured to receive creative code related to an advertisement for display on a web page. The link to a test page containing the creative code is passed to the web page testing service and the web page testing service virtually renders the test page while collecting performance metrics regarding a plurality of connections to servers made by the web page testing service during the rendering. The performance metrics regarding the plurality of connections are analyzed to identify optimizations to be added to the creative code, and the creative code is modified by applying the identified optimizations.

In further embodiments, an exemplary computer-readable storage medium comprises computer-executable instructions that, when executed by a processing resource of an ad optimization system, cause the ad optimization system to receive creative code related to an advertisement for display on a web page from a submitter. A link to a test page containing the creative code is passed to a web page testing service that virtually renders the test page while collecting performance metrics regarding a plurality of connections to servers made during the rendering. The collected performance metrics regarding the plurality of connections are analyzed to identify optimizations to be added to the creative code, and the creative code is modified by applying the identified optimizations. The modified creative code is then returned to the submitter Various embodiments and implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the scope of this application and protected by the accompanying claims.

DEFINITION OF TERMS

Ad—a web advertisement for display within and/or overlaid on page content through a web browser.

Ad Server—a web server that serves ads to web pages and other digital content platforms as well collecting and reporting data, such as impressions, clicks, etc., regarding the performance of the ads.

Ad Container—an HTML code section, such as a HTML "div" tag, in a web page in which the creative code for an ad will be contained as served by the ad server. In some systems, the ad server allows the admin to place custom HTML in the ad container surrounding the creative code.

Creative—the text, graphical, and metadata content of an ad.

Creative Code—a snippet of HTML/Code for the ad that the ad server delivers to a website.

Viewability Vendor—a third party company used to independently measure "viewability" performance of creatives for an advertiser or publisher.

Ad Call—a snippet of code in a page of a publisher's website that requests an ad from the ad server.

Viewable Ad—an ad that meets the industry standard for being viewable to the user.

Third Party Measurement Company—a company hired to provide analysis on the effectiveness of a given digital advertisement.

DETAILED DESCRIPTION

The following detailed description is directed to apparatuses, systems, and methods for optimizing rendering performance of a web page containing one or more advertisements. Some methods and technologies described herein may be implemented as software in a computer system accessible by admins and users over a network, such as the Internet.

According to embodiments, an ad optimization system may be implemented that frequently scans digital advertising creative used in web pages using synthetic testing tools, such as the open-source tool WebPageTest, to identify all connections needed by a particular ad. By scanning all creatives scheduled to a given site, the ad optimization system can determine common connections shared among all creatives. Utilizing this knowledge, the ad optimization system may provide multiple ways to increase the speed of the ads loading. Among the multiple ways to increase speed are:

- Update the ad container on the page with DNS prefetches, prefetching, and/or preconnects for connections shared amongst the majority of ads.
- Modify individual ads within the ad server and place the DNS prefetches, prefetching, and/or preconnects for connections contained within the ad at the top of the ad prior the ad tag/creative code.

Traditionally, a digital ad is served into a "div" or an "iFrame" element defined within the HTML of a page of a website or app display. In some cases, ads may be served into an industry standardized iFrame implementation called a "SafeFrame." While examples herein are described with respect to a standard div or iFrame, the same methodology and codes can be applied to a SafeFrame. The following code listing shows an example of a basic HTML page with ad containers, according to some embodiments:

```
<html>
  <head>
    <script src="https://generic_ad_server.com/lib/ad/tags.js">
    </script>
    <script>
       generic_ad_script.define_advertising_slot("ad_server_info/site/section1", "728x90", "div-ad-1")
       generic_ad_script.define_advertising_slot("ad_server_info/site/section2", "300x600", "div-ad-2")
    </script>
  </head>
  <body>
    <div id="div-ad-1" style="width: 728px; height: 90px">
      <script>
        generic_ad_script.display("div-ad-1")
      </script>
    </div>
    <div id="div-ad-2" style="width: 300px; height: 600px">
      <script>
        generic_ad_script.display("div-ad-2")
      </script>
    </div>
  </body>
</html>
```

The following code shows the HTML of the page after the browser initiated the ad call(s) to the specified ad server and the ad server returned the creative code:

```
<html>
    <head>
        <script src=""https://generic_ad_server.com/lib/ad/tags.js">
        </script>
        <script>
           generic_ad_script.define_advertising_slot("ad_server_info", "728x90", "div-ad-1")
           generic_ad_script.define_advertising_slot("ad_server_info2", "300x600", "div-ad-2")
        </script>
    </head>
    <body>
        <div id="div-ad-1" style="width: 728px; height: 90px">
            <script>
              generic_ad_script.display("div-ad-1")
              <iframe src="generic_ad_iframe.htm" height="90" width="728">
                <script language="javascript" type="text/javascript" src="advertiser_system.js?advertiser_id=1111&placement=45232&ad=231243">
                  <html>
                    <head>
                      <script type="text/javascript" async="" src="figeneric_ad_library.com/foo/234fwe.js"></script>
                      <script src="https://generic_ad_renering_library_123_234.js"
```

```
type="text/javascript" crossorigin="anonymous"></script>
      </head>
      <body>
        <img width="0" height="0"
src="https://123123.viewability_vendor.com/event.gif?id=123123&advertiser=23423423"
style="display: none;">
        <iframe id="iframe_viewability_2312341231"
name="iframe_viewability_2312341231"
src="https://cdn.viewability_vendor.com/ad_frame.html"></iframe>
        <script type="text/javascript" async=""
src="https://generid_ad_library.com/foo/239fwe.js"></script>
        <img width="0" height="0"
src="https://34535.viewability_vendor.com/event.gif?id=123123&advertiser=23423423"
style="display: none;">
        <img width="0" height="0"
src="https://34535.generic_ad_server.com/event.png?id=435345&advertiser=
43563456&sitg=2345234" style="display: none;">
        </iframe>
      </body>
    </html>
   </iframe>
  </script>
 </div>
 <div id="div-ad-2" style="width: 300px; height: 600px">
 <script>
   generic_ad_script.display("div-ad-2")
   <iframe src="generic_ad_iframe.htm" height="600" width="300">
    <script language="javascript" type="text/javascript"
src="advertiser_system.js?advertiser_id=11433&placement=234&ad=456645">
     <html>
      <head>
        <script type="text/jayascript" async=""
src="figenerid_ad_library.com/foo/435345wejs"></script>
        <script src="https://generic_ad_renering_library_123_4234.js"
type="text/jayascript" crossorigin="anonymous"></script>
      </head>
      <body>
        <img width="0" height="0"
src="https://4234.second_yiewability_yendor.com/eyent.gif?id=234&adyertiser=3543"
style="display: none;">
        <iframe id="iframe_yiewability_2312341231"
name="iframe_yiewability_2312341231"
src="https://cdn.second_yiewability_yendor.com/ad_frame.html"></iframe>
        <script type="text/jayascript" async=""
src="https://generid_ad_library.com/foo/2345345we.js"></script>
        <img width="0" height="0"
src="http://234234.second_yiewability_yendor.com/eyent.gif?id=123123&adyertiser=
23423423" style="display: none;">
        <img width="0" height="0"
src="https://234.generic_ad_seryer.com/eyent.png?id=234234&adyertiser=234324&sit
g=234234" style="display: none;">
        <img width="0" height="0"
src="https://third_party_measurement_compamy.com?id=4234&adyertiser=3543&
sitg=56756" style="display: none;">
        </iframe>
      </body>
    </html>
   </iframe>
  </script>
 </div>
 </body>
</html>
```

The following code shows the HTML page after the page initiated the ad call and the ad server returned creative code optimized by the ad optimization system, according to embodiments described herein. This example contains optimizations applied at the individual creative level. The optimizations are highlighted:

```
<html>
  <head>
    <script src="https://generic_ad_server.com/lib/ad/tags.js">
    </script>
    <script>
      generic_ad_script.define_advertising_slot("ad_server_info", "728x90", "div-ad-1")
      generic_ad_script.define_advertising_slot("ad_server_info2", "300x600", "div-ad-2")
    </script>
  </head>
```

```html
<body>
    <div id="div-ad-1" style="width: 728px; height: 90px">
        <script>
          generic_ad_script.display("div-ad-1")
            <iframe src="generic_ad_iframe.htm" height="90" width="728">
              <script language="javascript" type="text/javascript"
src="advertiser_system.js?advertiser_id=1111&placement=45232&ad=231243">
                <!- Prefetch JS files critical for ad rendering and measurement ->
                <link rel="prefetch" href="https://generic_ad_library.com/foo/234fwe.js">
                <link rel="prefetch" href="https://generic_ad_renering_library_123_234.js">
                <link rel="prefetch" href="https://generid_ad_library.com/foo/239fwe.js">
                <link rel="prefetch"
href="https://cdn.viewability_vendor.com/ad_frame.html">
                <!- Preconnect to domains for ad rendering and measurement ->
                <link rel="preconnect" href="https://34535.viewability_vendor.com">
                <link rel="preconnect" href="https://123123.viewability_vendor.com">
                <link rel="preconnect" href="https://34535.generic_ad_server.com">
                  <html>
                    <head>
                      <script type="text/javascript" async=""
src="//generic_ad_library.com/foo/234fwe.js"></script>
                        <script src="https://generic_ad_renering_library_123_234.js"
type="text/javascript" crossorigin="anonymous"></script>
                    </head>
                    <body>
                      <img width="0" height="0"
src="https://123123.viewability_vendor.com/event.gif?id=123123&advertiser=23423423"
style="display: none;">
                        <iframe id="iframe_viewability_2312341231"
name="iframe_viewability_2312341231"
src="https://cdn.viewability_vendor.com/ad_frame.html"></iframe>
                        <script type="text/javascript" async=""
src="https://generid_ad_library.com/foo/239fwe.js"></script>
                        <img width="0" height="0"
src="https://34535.viewability_vendor.com/event.gif?id=123123&advertiser23423423"
style="display: none;">
                        <img width="0" height="0"
src="https://34535.generic_ad_server.com/event.png?id=435345&advertiser=43563456&
sitg=2345234" style="display: none;">
                    </iframe>
                    </body>
                  </html>
                </iframe>
            </script>
        </div>
        <div id="div-ad-2" style="width: 300px; height: 600px">
          <script>
            generic_ad_script.display("div-ad-2")
            <!- Prefetch JS files critical for ad rendering and measurement ->
            <link rel="prefetch" href="https://generid_ad_library.com/foo/435345we.js">
            <link rel="prefetch" href="https://generic_ad_renering_library_123_4234.js">
            <link rel="prefetch"
href="https://cdn.second_viewability_vendor.com/ad_frame.html">
            <link rel="prefetch" href="https://generid_ad_library.com/foo/2345345we.js">
            <!- Preconnect to domains for ad rendering and measurement ->
            <link rel="preconnect" href="https://4234.second_viewability_vendor.com">
            <link rel="preconnect" href="https://234234.second_viewability_vendor.com">
            <link rel="preconnect" href="https://234.generic_ad_server.com">
            <link rel="preconnect" href="https://third_party_measurement_compamy.com">
            <iframe src="generic_ad_iframe.htm" height="600" width="300">
              <script language="javascript" type="text/javascript"
src="advertiser_system.js?advertiser_id=11433&placement=234&ad=456645">
                <html>
                  <head>
                    <script type="text/javascript" async=""
src="//generid_ad_library.com/foo/435345we.js"></script>
                      <script src="https://generic_ad_renering_library_123_4234.js"
type="text/javascript" crossorigin="anonymous"></script>
                  </head>
                  <body>
                    <img width="0" height="0"
src="https://4234.second_viewability_vendor.com/event.gif?id=234&advertiser=3543"
style="display: none;">
                      <iframe id="iframe_viewability_2312341231"
name="iframe_viewability_2312341231"
src="https://cdn.second_viewability_vendor.com/ad_frame.html"></iframe>
                      <script type="text/javascript" async=""
src="https://generid_ad_library.com/foo/2345345we.js"></script>
                      <img width="0" height="0"
```

```
          src="http://234234.second_viewability_vendor.com/event.gif?id=123123&advertiser=
       23423423" style="display: none;">
                      <img width="0" height="0"
       src="https://234.generic_ad_server.com/event.png?id=234234&advertiser=234324&sitg=
       234234" style="display: none;">
                      <img width="0" height="0"
       src="https://third_party_measurement_compamy.com?id=4234&advertiser=3543&sitg=
       56756" style="display: none;">
                    </iframe>
                 </body>
               </html>
            </iframe>
         </script>
       <div>
     </body>
  </html>
```

The following code shows the HTML page with optimized ad divs after the page initiated the ad call and the ad server returned creative code optimized by the ad optimization system, according to further embodiments. This example contains optimizations applied at the individual creative and the ad div levels. The optimizations are highlighted. According to some embodiments, the ad div functionality may be ad server dependent. Some ad servers may further provide the option to modify the surrounding ad div:

```
<html>
  <head>
     <script src="https://generic_ad_server.com/lib/ad/tags.js">
     </script>
     <script>
        generic_ad_script.define_advertising_slot("ad_server_info", "728x90", "div-ad-1")
        generic_ad_script.define_advertising_slot("ad_server_info2", "300x600", "div-ad-2")
     </script>
  </head>
  <body>
     <div id="div-ad-1" style="width: 728px; height: 90px">
        <!- Prefetch JS files critical for ad rendering and measurement ->
        <link rel="prefetch" href="https://generic_ad_library.com/foo/2342.js">
        <link rel="prefetch"
href="https://generic_ad_library.com/generic_ad_iframe.htm">
        <link rel="prefetch" href="https://cdn.viewability_vendor.com/ad_frame.html">
        <link rel="prefetch"
href="https://cdn.second_viewability_vendor.com/ad_frame.html">
        <script>
          generic_ad_script.display("div-ad-1")
          <iframe src="https://generic_ad_library.com/generic_ad_iframe.htm" height="90"
width="728">
          <script language="javascript" type="text/javascript"
src="advertiser_system.js?advertiser_id=1111&placement=45232&ad=231243">
             <!- Prefetch JS files critical for ad rendering and measurement ->
             <link rel="prefetch" href="https://generic_ad_library.com/
             <!- Preconnect to domains for ad rendering and measurement ->
             <link rel="preconnect" href="https://34535.viewability_vendor.com">
             <link rel="preconnect" href="https://123123.viewability_vendor.com">
             <link rel="preconnect" href="https://34535.generic_ad_server.com">
             <html>
                <head>
                   <script type="text/javascript" async=""
src="https://generic_ad_library.com/foo/2342.js"></script>
                   <script src="https://generic_ad_renering_library_123_234.js"
type="text/javascript" crossorigin="anonymous"></script>
                </head>
                <body>
                   <img width="0" height="0"
src="https://123123.viewability_vendor.com/event.gif?id=123123&advertiser=23423423"
style="display: none;">
                   <iframe id="iframe_viewability_2312341231"
name="iframe_viewability_2312341231"
src="https://cdn.viewability_vendor.com/ad_frame.html"></iframe>
                   <script type="text/javascript" async=""
src="https://generid_ad_library.com/foo/239fwe.js"></script>
                   <img width="0" height="0"
src="https://34535.viewability_vendor.com/event.gif?id=123123&advertiser"
```

```
style="display: none;">
                    <img width="0" height="0"
src="https://34535.generic_ad_server.com/event.png?id=435345&advertiser6&
sitg=2345234" style="display: none;">
                </iframe>
            </body>
        </html>
    </iframe>
    </script>
</div>
<div id="div-ad-2" style="width: 300px; height: 600px">
    <!- Prefetch JS files critical for ad rendering and measurement ->
    <link rel="prefetch" href="https://generid_ad_library.com/foo/435345wejs">
    <link rel="prefetch" href="https://generic_ad_renering_library_123_4234.js">
    <link rel="prefetch"
href="https://cdn.second_viewability_vendor.com/ad_frame.html">
    <link rel="prefetch" href="https://generid_ad_library.com/foo/2345345wejs">
    <script>
      generic_ad_script.display("div-ad-2")
      <!- Preconnect to domains for ad rendering and measurement ->
      <link rel="preconnect" href="https://4234.second_viewability_vendor.com">
      <link rel="preconnect" href="https://234234.second_viewability_vendor.com">
      <link rel="preconnect" href="https://234.generic_ad_server.com">
      <link rel="preconnect" href="https://third_party_measurement_company.com">
      <iframe src="https://generic_ad_library.com/generic_ad_iframe.htm" height="600"
width="300">
        <script language="javascript" type="text/javascript"
src="advertiser_system.js?advertiser_id=11433&placement=234&ad=456645">
            <html>
                <head>
                    <script type="text/javascript" async=""
src="//generid_ad_library.com/foo/435345wejs"></script>
                    <script src="https://generic_ad_renering_library_123_4234.js"
type="text/javascript" crossorigin="anonymous"></script>
                </head>
                <body>
                    <img width="0" height="0"
src="https://4234.second_viewability_vendor.com/event.gif?id=234&advertiser=3543"
style="display: none;">
                    <iframe id="iframe_viewability_2312341231"
name="iframe_viewability_2312341231"
src="https://cdn.second_viewability_vendor.com/ad_frame.html"></iframe>
                    <script type="text/javascript" async=""
src="https://generid_ad_library.com/foo/2345345we.js"></script>
                    <img width="0" height="0"
src="http://234234.second_viewability_vendor.com/event.gif?id=123123&advertiser=
234423423" style="display: none;">
                    <img width="0" height="0"
src="https://234.generic_ad_server.com/event.png?id=234234&advertiser=234324&sitg=
234234" style="display: none;">
                    <img width="0" height="0"
src="https://third_party_measurement_company.com?id=4234&advertiser=3543&sitg=
56756" style="display: none;">
                </iframe>
            </body>
        </html>
    </iframe>
    </script>
    <div>
  </body>
</html>
```

By continually monitoring ads and their connections and modifying the ad container and/or the ad code with these optimizations, significant performance improvements in web page loading and rendering can be realized. By making the ads load faster, the capacity of a given website to deliver ads may be increased. Within the advertising space, a lot of advertisers are only willing to pay for viewable ads. By speeding up the ad load time, more revenue can be generated by making ads that may not register as viewable because of poor design of an ad and/or poor internet connection load faster.

Figure 2:
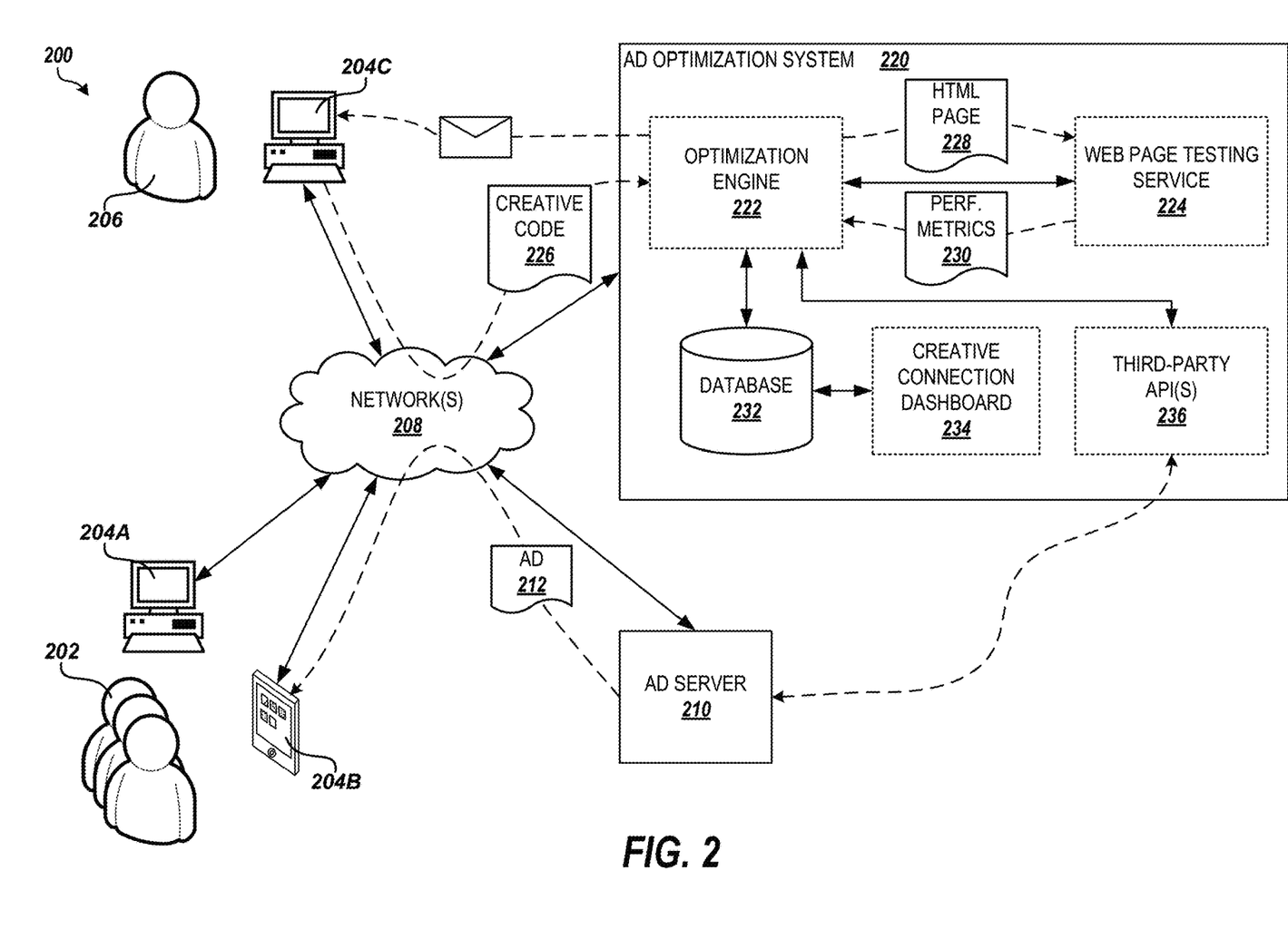
FIG. 2 is a block diagram of an environment in which methods, apparatuses, and systems used to optimize rendering performance of web pages containing one or more advertisements may be implemented, according to embodiments described herein.

FIG. 2 shows an illustrative environment 200 in which a system for optimizing rendering performance of web pages containing one or more advertisements may be implemented, according to some embodiments. The environment 200 includes end users 202 using end-user computing devices 204A, 204B (referred to herein generally as "end-user computing devices 204"). The end-user computing devices 204 may represent typical desktop PCs, workstations, laptops, tablets, mobile devices, smartphones, and/or the like utilized by end users to access content and other data from web pages across one or more networks 208. The network(s) 208 may represent local area networks ("LANs"), wide area network ("WANs"), and/or other data, broadband, or telecommunication networks that collectively make up the Internet.

According to embodiments, the web pages accessed by the end users 202 include embedded digital ads, such as ad 212 (referred to herein generally as "ads 212"), displayed within, overlaid upon, or otherwise in conjunction with the content or data displayed on the end-user computing devices 204. In some embodiments, each ad 212 is served to the end-user computing devices 204 over the network(s) 208 by an ad server 210 based on HTML tags and/or other metadata included in the web pages. The ad server 210 may represent one or more server computers or virtual machines operably connected together and connected to the end-user computing devices 204 by the network(s) 208. Alternatively or additionally, the ad server 210 may comprise cloud-based processing, database, and storage resources available to the end-user computing devices 204 over the network(s) 208.

The environment 200 further includes an ad optimization system 220. According to embodiments, an ad optimization system 220 comprises one or more server computers or virtual machines operably connected together and available to optimization users 206 through end-user computing devices 204C over the network(s) 208. Alternatively or additionally, the ad optimization system 220 may comprise cloud-based processing, database, and storage resources available to the optimization users 206 over the network(s) 208. Examples of optimization users 206 may include, but are not limited to, publisher ad operations users, creative agency users, viewability vendor users, advertiser's campaign users, and the like.

According to some embodiments, the ad optimization system 220 may include an optimization engine 222. The optimization engine 222 may comprise one or more software components or modules that analyze creatives targeted for ads in a web page or website submitted by optimization users 206 or third-party vendor systems and makes optimizations to the creative code for increasing the load performance of the ads on the web page or pages of the website. The optimization engine 222 may be implemented in any number of programming languages including, but not limited to, Java, C#, PHP, Python, and/or the like. The optimization engine 222 may also perform statistical analysis on data returned from the analysis and optimization, such as calculating timing of connections, calculating the standard deviation across all connections, and the like. The statistical analysis can be performed by various software components or modules, including, but not limited to, R, SAS, Statwing, Pandas, and the like. One example implementation of the optimization engine 222 includes utilizing the Python language to develop the core software processes and implementing Pandas for the statistical analysis of calculating connection durations and standard deviation among all connections.

In further embodiments, the ad optimization system 220 may include a web page testing service 224. The web page testing service 224 may test load performance of ads for a specified web page (URL) and provide performance metrics to the optimization engine 222 for performing the optimizations. For example, the web page testing service 224 may implement one or more virtual web browser(s) that retrieve and virtually render the content from the web page while identifying and monitoring all connections made by the browser(s) and recording timing values for each connection, such as DNS lookup; HTTP connect; SSL handshake; HTML, script, and/or other content download; and the like. The web page testing service 224 may comprise one or more software components or modules developed in any number of programming languages including, but not limited to, Java, C#, PHP, Python, and/or the like. Alternatively or additionally, the web page testing service 224 may comprise a remote or third-party web page testing system, such as the open-source WebPageTest service. The WebPageTest service may provide all performance metrics and other testing information needed by the optimization engine 222.

According to some embodiments, an optimization user 206 may submit the creative code 226 for a creative or a group of creatives along with associated metadata (e.g., advertiser ID, creative ID, etc.) to the optimization engine 222 for analysis. In some embodiments, the creative code 226 and associated metadata may be uploaded to the optimization engine 222 through a web form provided by the ad optimization system 220 over the network(s) 208. In further embodiments, the optimization user 206 may send an email to a mailbox monitored by the ad optimization system 220 specifying the associated metadata with the creative code 226 in the body of the email or attached to the email as an attachment.

The optimization engine 222 retrieves the creative code 226 sent by the optimization user 206 and creates a basic local HTML page from which the creative(s) will serve. The optimization engine 222 then submits the HTML page 228 to the web page testing service 224 to test load times. The web page testing service 224 returns performance metrics 230 back to the optimization engine 222 with details of each connection established, including connection times and the like, as further shown in FIG. 2. The optimization engine 222 may then analyze the details of each connection and the URLs referenced in the creative code 226 and identifies slow connections. According to some embodiments, the optimization engine 222 may further analyze the information from the testing of the web page testing service 224 of the HTML page 228 to identify all cookies values, cookie expiration information, URL info, ID values from connections and cookies, and the like. The ID values may be parsed from URLs specified in the creative code 226, e.g.: http://foo.com?creativeID=1245&placementID=123213.

The optimization engine 222 may then determine whether optimizations, such as DNS prefetch or preconnect specifications, should be added for each connection based on the performance metrics 230 associated with the connection. The optimization engine 222 may then modify the original creative code 226 provided by the optimization user 206 by inserting optimization code including the DNS prefetch or preconnect specifications in the HTML. The modified creative code may then be sent by the optimization engine 222 back to the optimization user 206 via email, for example, for the user to upload to the ad server 210 for optimal loading of the creative(s) in ads 212 served by the ad server. In further embodiments, the optimization engine 222 may include a report including detailed information regarding the connections and corresponding performance metrics associated with the creative(s) with the returned, modified creative code.

According to further embodiments, the optimization engine 222 may store the creative code 226 and associated metadata in a database 232 or other storage component of the ad optimization system 220. The optimization engine 222 may further store the performance metrics 230 returned by the web page testing service 224 associated with the creative code 226 in the database, along with an indication of the optimizations made to the creative code. In some embodiments, the optimization engine 222 may recheck the creative code 226 through the web page testing service 224 at defined intervals and alert the optimization user 206 of any changes, allowing the optimization process to be reapplied to the creative code. The optimization user 206 may further be provided a facility to send daily delivery reports to the optimization engine 222 to allow the optimization engine to monitor ad creative performance.

Figure 3:
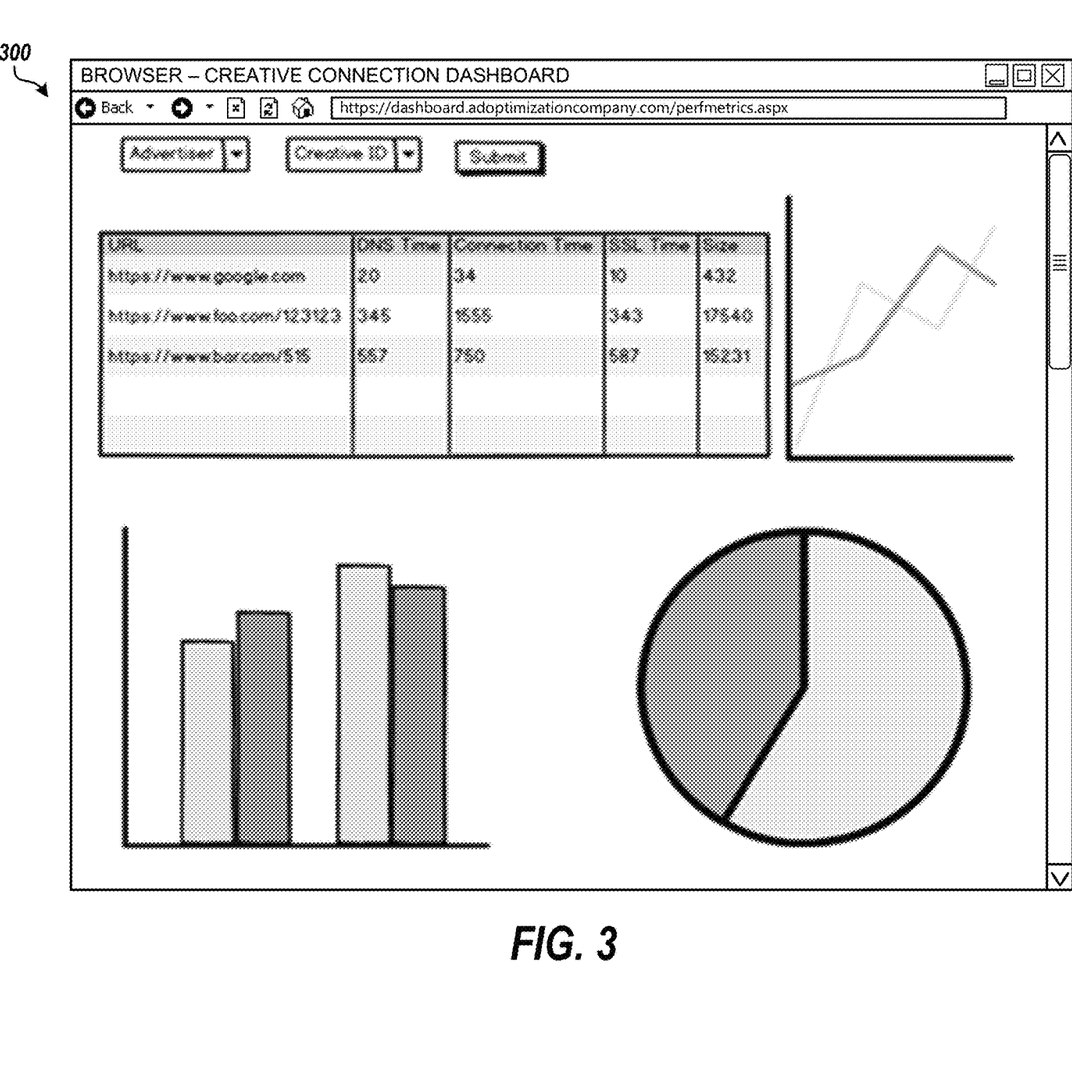
FIG. 3 is a screen diagram showing a GUI for an exemplary creative connection dashboard, according to embodiments described herein.

In further embodiments, the ad optimization system 220 may include a creative connection dashboard 234. In addition to the detailed information regarding the connections and corresponding performance metrics emailed to the optimization user 206, the user may have access to the creative connection dashboard 234 to view connection and performance information as well as receive alerts when any changes occur. In some embodiments, the creative connection dashboard 234 may comprise a website implemented in any programming language and/or web application architecture known in the art and may access the database 232 described above to display connection and performance information to the optimization user 206 through a user interface, such as the browser window 300 shown in FIG. 3.

In further embodiments, the ad optimization system 220 may include one or more third-party APIs ("third-party APIs") 236. The third-party APIs 236 may allow third-party vendor systems to interface directly with the optimization engine 222 to automatically request optimization of creative code 226 and/or provide delivery and performance information associated with a creative. Examples of third-party vendor systems may include, but are not limited to, a third-party ad server 210, a third-party measurement company system, and the like. Because most advertiser utilize a third-party ad server and/or a third-party measurement company, it can be difficult to pin point performance improvements made by the ad optimization system 220. There may also be discrepancies between first-party delivery numbers and third-party delivery numbers. While a website may only have one ad tag from the advertiser to traffic in their system, the advertiser may have multiple creatives rotating through that tag. It can be a challenge to identify changes and be able to definitively state that they were caused by the changes. To solve this, the ad optimization system 220 may implement changes and measure utilizing performance testing services for a full 24 hour period. By doing this, all creatives served on a given day that are impacted by the changes may be known. The first-party numbers from a company's ad server can be compared with any numbers from the third-party systems to ensure that they were caused by the changes that were tested.

According to some embodiments, a third-party vendor system, such as a third-party ad server 210, may submit creative code 226 along with associated metadata directly to the optimization engine 222 through a third-party API 236. In some embodiments, the ad server 210 may include a preview link for the creative along with the creative code 226. If a preview link was included with the creative code 226, the optimization engine 222 may pass the preview link to the web page testing service 224 for load performance testing. If no preview link was provided, then the optimization engine 222 creates the basic local HTML page for the creative code 226 for the web page testing service 224, as was the case in a manual submission from an optimization user 206 described above. The optimization engine 222 may then analyze the details of each connection returned from the web page testing service 224 and the URLs referenced in the creative code 226 to determine whether optimizations, such as DNS prefetch or preconnect specifications, should be added for each connection based on the performance metrics 230 associated with the connection.

The optimization engine 222 may then modify the original creative code 226 by inserting optimization code including the DNS prefetch or preconnect specifications in the HTML, and return the modified creative code directly to the ad server 210 via the third-party API 236. In further embodiments, the optimization engine 222 may further send the report including detailed information regarding the connections and corresponding performance metrics associated with the creative(s) to an email address associated with the ad server 210 for analysis be third-party vendor personnel. If the third-party API 236 and associated third-party vendor system supports it, the optimization engine 222 may submit the information/data from the report directly to the third-party vendor system through the third-party API for automated analysis and reporting. According to further embodiments, the third-party API 236 may provide interface(s) for the optimization engine 222 to query the ad server 210 for delivery and performance information regarding the creative for use in ongoing analysis and optimization. The optimization engine 222 may then recheck the creative at defined intervals and send re-optimized creative code to the ad server 210 and/or alert the third-party vendor personnel to any changes.

The number and type of third-party APIs 236 implemented may depend on the third-party vendor system(s) interfacing with the ad optimization system 220 and the requirements thereof. Third-party APIs 236 may be implemented in any number of programming languages and API architectures, including, but are not limited to, Simple Object Access Protocol ("SOAP"), Remote Procedure Calls ("RPC"), Representational State Transfer ("REST"), and the like. An example implementation may include utilizing Python and a communication a utility package, such as the Requests package, to implement the third-party API 236 with the third-party vendor system.

Figure 4:
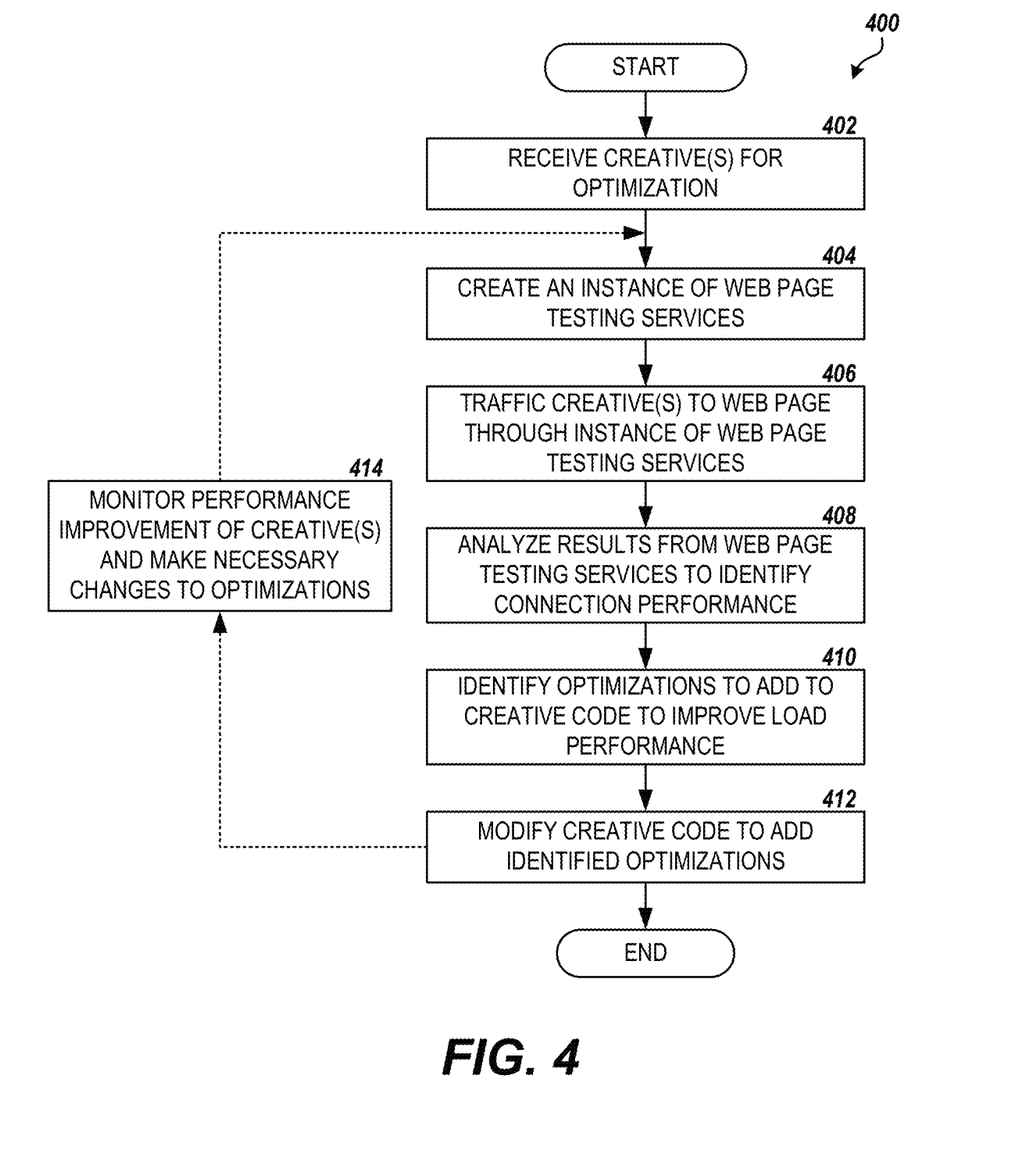
FIG. 4 is a flow diagram showing one routine for optimizing rendering performance of web pages containing one or more advertisements, according to embodiments described herein.

FIG. 4 illustrates one routine 400 for optimizing rendering performance of web pages containing one or more advertisements, according to some embodiments. According to embodiments, the routine 400 may be performed at least in part by the optimization engine 222 executing in the ad optimization system 220 in conjunction with the web page testing service 224. In further embodiments, the routine 400 may be performed by processing resources of the ad optimization system 220 or by some other combination of components, processing resources, or systems.

The routine 400 begins at step 402, where the optimization engine 222 receives creative code 226 associated with one or more creatives to be analyzed and/or optimized. For example, the optimization engine 222 may receive creative code 226 submitted to the optimization engine by an optimization user 206 through a web form or in the body of an email message. The creative code 226 submitted by the optimization user 206 may be associated with an individual creative and may be accompanied by metadata identifying the creative, the associated advertiser, and the like. In another example, the optimization engine may receive creative code 226 intended to traffic a number of ads/creatives from an ad server 210 through a third-party API 236 along with a preview link for the creative code. Other examples of methods of submitting creative code 226 associated with a creative or a group of creatives along with associated metadata may be imagined by one skilled in the art upon reading this disclosure, and it is intended that all such methods be included within the scope of this application.

From step 402, the routine 400 proceeds to step 404, where the optimization engine 222 creates an instance of the web page testing service 224 for testing the load performance of the creative(s) associated with the received creative code 226. The optimization engine 222 may additionally provide an IP address associated with the instance of the web page testing service 224 to any third-party measurement vendor associated with creative(s) so that the measurement vendor may white list the IP address and not flag the IP address as a bot.

Next, the routine 400 proceeds from step 404 to step 406, where the optimization engine 222 traffics the creative(s) through the instance of the web page testing services 224 in order to analyze load performance. If a preview link was provided with the creative code 226, the optimization engine 222 may pass the preview link to the web page testing service 224 for the load performance testing. If no preview link was provided, then the optimization engine 222 may create a basic test HTML page for the creative code 226 and pass the URL of the test page to web page testing service 224. The web page testing service 224 may load the creative code 226 a number of times to test load performance and connection timings of the associated creative(s), returning the performance metrics 230 back to the optimization engine 222 with details of each connection established, including connection times.

The routine 400 proceeds from step 406 to step 408, where the optimization engine 222 analyzes the performance metrics 230 returned by web page testing service 224 to determine the relative performance of each connection. The optimization engine 222 may utilize statistical analysis across all of the connection timings, including DNS lookup, HTTP connection, SSL handshake, and content download timings, to determine performance values for each connection to a particular server or service. The routine 400 then proceeds to step 410, where the optimization engine 222 identifies optimizations to add to the creative code 226 to improve load performance. For example, the optimization engine 222 may determine that DNS prefetch and/or preconnect specifications should be added to the HTML for a particular server/service having multiple connections and slow DNS lookup, HTTP connection, and/or SSL handshake times that could be improved by the optimizations.

From step 410, the routine 400 proceeds to step 412, where the optimization engine 222 applies the identified optimizations to the creative code 226. For example, the optimization engine 222 may insert the identified DNS prefetch and/or preconnect specifications into the HTML. In some embodiments, where a number of creatives were submitted for analysis, the optimization engine 222 may further identify those server connections that were shared across some or all of the corresponding ads in the web page testing service 224. If the target ad server 210 allows custom code to be inserted around the ad container on the web page, then the optimization engine 222 made add the optimizations for the shared connections, such as the DNS prefetch and/or preconnect specifications, to the HTML for the ad container. Otherwise, the optimizations may be applied to the creative code 226 at the creative level.

According to some embodiments, the routine 400 proceeds from step 412 to step 414, where the optimization engine 222 monitors the performance improvements for the web pages or website and makes and necessary changes to the optimizations on a regular basis. For example, the optimization engine 222 may periodically query the performance metrics from the ad server 210 or other third-party vendor system through a third-party API 236 to determine if a material change in load performance has occurred, and repeat the optimization process as necessary. In other embodiments, from step 412, the routine 400 ends.

Figure 5:
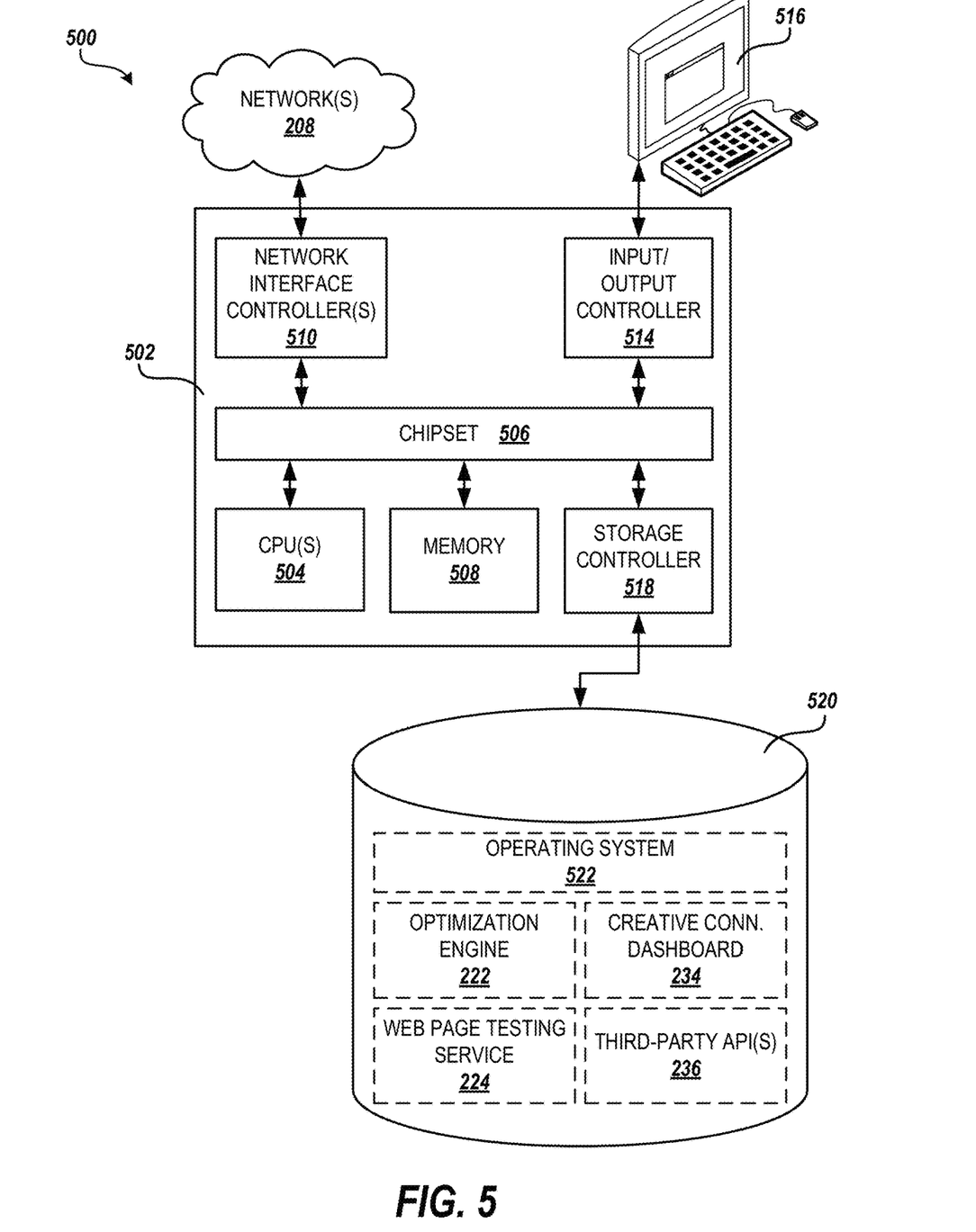
FIG. 5 is a block diagram showing an example computer architecture for computer(s) capable of executing the software components described herein, according to embodiments described herein.

FIG. 5 shows an example computer architecture 500 for a computer 502 capable of executing software components described herein for optimizing rendering performance of web pages containing one or more advertisements. The computer architecture 500 shown in FIG. 5 illustrates a conventional desktop computer, laptop, workstation, server, or other computing device, and may be utilized to execute any aspects of the software components presented herein described as executing on the end-user computing devices 204, the ad server 210, the ad optimization system 220, or other computing platform. The computer 502 may include a baseboard, or "motherboard," which is a printed circuit board to which a multitude of components or devices may be connected by way of a system bus or other electrical communication paths.

In some embodiments, one or more central processing units ("CPUs") 504 operate in conjunction with a chipset 506. The CPU(s) 504 may be standard programmable processors that perform arithmetic and logical operations necessary for the operation of the computer 502. The chipset 506 provides an interface between the CPU(s) 504 and the remainder of the components and devices on the baseboard. The chipset 506 may provide an interface to a memory 508. The memory 508 may include a random access memory ("RAM") used as the main memory in the computer 502. The memory 508 may further include a computer-readable storage medium such as a read-only memory ("ROM") or non-volatile RAM ("NVRAM") for storing basic routines that that help to startup the computer 502 and to transfer information between the various components and devices. The ROM or NVRAM may also store other software components necessary for the operation of the computer 502 in accordance with the embodiments described herein.

According to various embodiments, the computer 502 may operate in a networked environment using logical connections to remote computing devices through one or more networks, such as the network(s) 208 described herein in regard to FIG. 2 or any other networking topology known in the art that connects the computer 502 to other, remote computers or computing systems. The chipset 506 may include functionality for providing network connectivity through one or more network interface controllers ("NICs") 510, such as a gigabit Ethernet adapter. It should be appreciated that any number of NIC(s) 510 may be present in the computer 502, connecting the computer to other types of networks and remote computer systems beyond those described herein.

The computer 502 may also include an input/output controller 514 for interfacing with various external devices and components, such as standard user interface components 516 of a keyboard, mouse, and display, for example. Other examples of external devices that may be interfaced to the computer 502 by the input/output controller 514 include, but are not limited to, a touchpad, a touch screen, an electronic stylus, a computer monitor or other display, a printer, an external storage device, such as a Flash drive, a mobile device, a sensor, an actuator, and the like. According to some embodiments, the input/output controller 514 may include a USB controller.

The computer 502 may be connected to one or more mass storage devices 520 that provide non-volatile storage for the computer. Examples of mass storage devices 520 include, but are not limited to, hard disk drives, solid-state (Flash) drives, optical disk drives, magneto-optical disc drives, magnetic tape drives, memory cards, holographic memory, or any other computer-readable media known in the art that provides non-transitory storage of digital data and software. The mass storage device(s) 520 may be connected to the computer 502 through a storage controller 518 connected to the chipset 506. The storage controller 518 may interface with the mass storage devices 520 through a serial attached SCSI ("SAS") interface, a serial advanced technology attachment ("SATA") interface, a fiber channel ("FC") interface, or other standard interface for physically connecting and transferring data between computers and physical storage devices.

The mass storage device(s) 520 may store system programs, application programs, other program modules, and data, which are described in greater detail in the embodiments herein. According to some embodiments, the mass storage device(s) 520 may store an operating system 522 utilized to control the operation of the computer 502. In some embodiments, the operating system 522 may comprise the WINDOWS® operating system from MICROSOFT Corporation of Redmond, Wash. In other embodiments, the operating system 522 may comprise the LINUX operating system, the WINDOWS® SERVER operating system, the UNIX operating system, or the like. The mass storage device(s) 520 may store other system or application program modules and data utilized by the computer 502, optimization engine 222, the web page testing service 224, the creative connection dashboard 234, or the third-party APIs 236 shown in FIG. 2 and described in the various embodiments. The mass storage device(s) 520 may further any other software, program modules, or data described herein. In some embodiments, the mass storage device(s) 520 may be encoded with computer-executable instructions that, when executed by the computer 502, perform the routine 400 described in regard to FIG. 4 for optimizing rendering performance of web pages containing one or more advertisements.

It will be appreciated that the computer architecture 500 may not include all of the components shown in FIG. 5, may include other components that are not explicitly shown in FIG. 5, or may utilize an architecture completely different than that shown in FIG. 5. For example, the CPU(s) 504, memory 508 and mass storage devices 520, and NIC(s) 510 of the computer architecture 500 may represent virtualized resources from any number of server computers or computing devices, or may represent generic processing resources, storage resources, and communication resources, respectively, of a cloud-based computing system, with the chipset 506 representing communication interlinks between the processing, storage, communication, and other computing resources in the cloud-based computing system. It is intended that all such computing architectures be included within the scope of this application.

Based on the foregoing, it should be appreciated that technologies for optimizing rendering performance of a web page containing one or more advertisements are described herein. The subject matter described above is provided by way of illustration only and should not be construed as limiting. Various modifications and changes may be made to the subject matter described herein without following the example embodiments and applications illustrated and described, and without departing from the true spirit and scope of the present invention.

What is claimed is:

1. A method of optimizing rendering performance of web pages containing an advertisement, the method comprising steps of:

receiving, by an optimization engine, creative code related to the advertisement;

virtually rendering, by a web page testing service, a web page containing the creative code while collecting performance metrics regarding a plurality of connections to servers made by the web page testing service during the rendering;

analyzing, by the optimization engine, the performance metrics regarding the plurality of connections to identify optimizations to be added to the creative code; and modifying, by the optimization engine, the creative code by applying the identified optimizations, wherein applying the identified optimizations comprises inserting one or more of a DNS prefetch HTML specification, a preconnect HTML specification, a prefetch HTML specification, and a preload HTML specification into an ad container HTML element for displaying the advertisement.

2. The method of claim 1, wherein the performance metrics regarding the plurality of connections to servers comprises one or more of DNS lookup time, an HTTP connection time, an SSL handshake time, and a content downloading time for each connection.

3. The method of claim 2, wherein analyzing the performance metrics comprises performing statistical analysis of multiple connections to a first server, and wherein identifying the optimizations comprises determining that connections to the first server exhibit one or more of a slow DNS lookup time, a slow HTTP connection time, and a slow SSL handshake time.

4. The method of claim 1, wherein the creative code is received from an optimization user in an email, the method furthering comprising, returning, by the optimization engine, the modified creative code to the optimization user via email.

5. The method of claim 1, wherein the creative code is received from an ad server through a third-party API, the method furthering comprising, returning, by the optimization engine, the modified creative code to the ad server through the third-party API.

6. The method of claim 1, wherein a preview link associated with the creative code is received by the optimization engine, and wherein the optimization engine forwards the preview link associated with the creative code to the web page testing service to facilitate the virtual rendering of the web page containing the creative code.

7. The method of claim 1, further comprising upon receiving the creative code, creating, by the optimization engine, a basic web page containing the creative code, and wherein the web page virtually rendered by the web page testing service comprises the basic web page.

8. A system comprising:

a web page testing service; and a processing resource operably connected to the web page testing service and executing an optimization engine configured to:

receive creative code related to an advertisement for display on a web page, pass a link to a test page containing the creative code to the web page testing service, the web page testing service virtually rendering the test page while collecting performance metrics regarding a plurality of connections to servers made by the web page testing service during the rendering, analyze the performance metrics regarding the plurality of connections to identify optimizations to be added to the creative code, and modify the creative code by applying the identified optimizations, wherein applying the identified optimizations comprises inserting one or more of a DNS prefetch HTML specification, a preconnect HTML specification, a prefetch HTML specification, and a preload HTML specification into an ad container HTML element for displaying the advertisement.

9. The system of claim 8, wherein the performance metrics regarding the plurality of connections to servers comprises one or more of DNS lookup time, an HTTP connection time, an SSL handshake time, and a content downloading time for each connection.

10. The system of claim 9, wherein analyzing the performance metrics comprises performing statistical analysis of multiple connections to a first server, and wherein identifying the optimizations comprises determining that connections to the first server exhibit one or more of a slow DNS lookup time, a slow HTTP connection time, and a slow SSL handshake time.

11. The system of claim 8, wherein a preview link associated with the creative code is received by the optimization engine, and wherein the link to the test page passed to the web page testing service comprises the preview link.

12. The system of claim 8, wherein the optimization engine is further configured to, upon receiving the creative code, create the test page containing the creative code.

13. The system of claim 8, further comprising a creative connection dashboard configured to display information regarding the performance metrics regarding the plurality of connections to servers collected by the web page testing service to an optimization user associated with a submission of the creative code to the optimization engine.

14. A non-transitory computer-readable medium containing computer-executable instructions that, when executed by a processing resource of an ad optimization system, cause the ad optimization system to:
   receive from a submitter creative code related to an advertisement for display on a web page;
   pass a link to a test page containing the creative code to a web page testing service, the web page testing service virtually rendering the test page while collecting performance metrics regarding a plurality of connections to servers made by the web page testing service during the rendering;
   analyze the performance metrics regarding the plurality of connections to identify optimizations to be added to the creative code;
   modify the creative code by applying the identified optimizations, wherein applying the identified optimizations comprises inserting one or more of a DNS prefetch HTML specification, a preconnect HTML specification, a prefetch HTML specification, and a preload HTML specification into an ad container HTML element for displaying the advertisement; and
   return the modified creative code to the submitter.

15. The non-transitory computer-readable medium of claim 14, wherein the submitter comprises an optimization user and the creative code is received in an email, and wherein returning the modified creative code comprises sending the modified creative code in an email to the optimization user.

16. The non-transitory computer-readable medium of claim 14, the submitter comprises an ad server and the creative code is received through a third-party API.

17. The non-transitory computer-readable medium of claim 14, wherein applying the identified optimizations comprises inserting one or more of a DNS prefetch HTML specification, a preconnect HTML specification, a prefetch HTML specification, and a preload HTML specification into an ad container HTML element for displaying the advertisement.

* * * * *